United States Patent
Maucher et al.

[15] 3,695,405
[45] Oct. 3, 1972

[54] CLUTCH DISC

[72] Inventors: Paul Maucher, Neuweier; Klaus Steeg, Eisenthal, both of Germany

[73] Assignee: Luk Lamellen und Kupplungsbau GmbH, Baden, Germany

[22] Filed: April 21, 1970

[21] Appl. No.: 30,482

[30] Foreign Application Priority Data

April 22, 1969 Germany..........P 19 20 242.7

[52] U.S. Cl..........192/106.2, 192/106.1, 192/107 C, 64/27 F
[51] Int. Cl..............................................F16d 3/14
[58] Field of Search..........192/106.1, 106.2, 107 CP; 64/27 F

[56] References Cited

UNITED STATES PATENTS

| | | | |
|---|---|---|---|
| 2,547,427 | 4/1951 | Zeidler | 192/107 CP |
| 2,596,588 | 5/1952 | Narrin | 192/107 CP |
| 2,618,369 | 11/1952 | Zeidler | 192/107 CP |
| 3,261,439 | 7/1966 | Binder | 192/107 CP |
| 2,281,898 | 5/1942 | Whitten | 192/107 CP |

*Primary Examiner*—Allan D. Herrmann
*Assistant Examiner*—Randall Heald
*Attorney*—Curt M. Avery, Arthur E. Wilfond, Herbert L. Lerner and Daniel J. Tick

[57] ABSTRACT

Clutch disc includes a hub, an entrainer plate coaxially disposed and turnable relative to the hub, a pair of clutch friction linings mounted coaxially to one another and to the hub, a damping device located in a force transmission path between the entrainer plate and the hub, on the one hand, and between the pair of clutch friction linings, on the other hand, the damping device comprising force storing means operatively connected to the hub and to the entrainer plate, damping lining means disposed coaxially to the hub, a spring member in stressing engagement with the damping lining means so as to frictionally connect the same to the entrainer plate, the spring member being located in a space between the relatively turnable entrainer plate and the hub and being in the form of a disc abutting the damping lining means at one side thereof and the entrainer plate at the other side thereof, the pair of clutch friction linings being carried by the spring member.

10 Claims, 9 Drawing Figures

CLUTCH DISC

Our invention relates to clutch disc and more particularly to such a clutch disc wherein a damping device is located in the force transmission path between a pair of friction linings, on the one hand, and between an entrainer plate and the hub of the clutch disc, on the other hand, the damping device comprising force storing means operatively connected to the hub and to the entrainer plate disposed coaxially to and turnable relative to the hub, and damping linings stressed by a spring member and being in frictional engagement with the entrainer plate.

With such so-called oscillation-damping clutch discs, as have been known, for example from U.S. Pat. 2,277,558, the irregular oscillations within the force transmission between the motor and transmission system should be reduced and the oscillation noises accompanying the same eliminated. In the aforementioned conventional clutch disc, two cover discs turnable coaxially about a hub are provided, one of the cover discs serving as carrier plate for clutch friction linings. Between both cover discs there is located a flange extending from the hub and provided with window-shaped recesses wherein helical springs are inserted in peripheral direction of the clutch disc. The helical springs cooperate with one of the substantially radially directed end contours of these recesses, on the one hand, and on the other hand, also with one of the substantially radially extending end contours of the window-shaped recesses, which are formed in the cover discs. A diametrically inner region of the cover discs abuts a respective damping lining which is located on each side of the hub flange and disposed coaxial thereto. Both cover discs are firmly connected to one another by spacer rivets which are provided in an outer and inner diametrical region of the cover discs. Both cover discs are prestressed toward one another by the spacer rivets so that a force is exerted on the friction linings whereby a damping effect is produced.

It has been found, however, that with such clutch discs the damping effect changes and diminishes after a relatively short period of time due to irregular wear and due to the reduction in the applied force caused by the wearing action. An attempt was made to eliminate this disadvantage by inserting a wave-shaped spring washer between the flange and at least one of the damping linings, as taught for example in German Pat. No. 916,016.

In German petty Pat. No. 1,686,364, it has been proposed to apply the compressive force to the damping linings and to the cover discs that are in frictional engagement with the damping linings by means of a plate spring which abuts the hub, on the one hand, and one of the cover discs, on the other hand. The relatively large pressure drop of these prestressed members such as the aforementioned wave-shaped discs and plate springs along the wearing path of the damping linings do not assure the required uniform damping, however, even with such constructions.

It was recognized in British Pat. No. 909,914, that a uniform applied force over the wearing path of the damping linings is obtainable by means of a springy or resilient member which exhibits radial expansion that exceeds the radial expansion of the damping linings and is applicable to clutch discs. With such clutch discs, a plate-like spring element having radially outwardly directed arms was firmly fastened to the outside of the entrainer plate and the cover disc by spacer rivets. With such clutch discs, however, both the transverse as well as longitudinal stability of the disc is no longer assured because the centering guidance of the disc parts relatively turnable about the hub no longer is effected by the two rigid cover discs, but rather is effected either by only one of the cover discs and the unstable or changeable spring member or, however, in another embodiment, only by both changeable or unstable spring members riveted to the outside of each of the cover discs. Such a disc is thus extremely unstable and especially during axial displacement on the keyed shaft and during the assembly process is extremely sensitive and susceptible to trouble.

It is accordingly an object of our invention to provide clutch disc which avoids the aforementioned disadvantages of the heretofore know clutch discs of this general type and which is moreover damped in such a manner that the damping effect over the entire life span of the clutch and over the path of wear of the damping linings exhibits an optimal constant value without suffering a loss in the stability thereof. It is a further object of our invention to provide such a clutch disc which is relatively simply assemblable and which can be produced economically.

It is a further object of our invention to provide clutch disc which utilizes a novel and advantageous spring loading action for the clutch friction linings.

With the foregoing and other objects in view we provide, in accordance with our invention clutch disc comprising a hub, an entrainer plate coaxially disposed and turnable relative to the hub, a pair of clutch friction linings mounted coaxially to one another and to the hub, a damping device located in a force transmission path between the entrainer plate and the hub, one the one hand, and between the pair of clutch friction linings, on the other hand, the damping device comprising force storing means operatively connected to the hub and to the entrainer plate, damping lining means disposed coaxially to the hub, a spring member in stressing engagement with the damping lining means so as to frictionally connect the same to the entrainer plate, the spring member being located in a space between the relatively turnable entrainer plate and the hub and being in the form of a disc abutting the damping lining means at one side thereof and the entrainer plate at the other side thereof, the pair of clutch friction linings being carried by the spring member.

In accordance with further features of the invention, the spring disc at a diametrically inner region thereof stands away on one side thereof from the plane in which the remainder of the disc is disposed, the region thus standing away extending radially outwardly over the damping linings. In the assembled condition of the clutch disc, the spring disc is advantageously prestressed in direction toward the damping linings, the prestressing being substantially constant over the path of wear of the damping linings.

In accordance with a further feature of the invention and depending respectively upon the thickness and the spring characteristic of the spring disc, there are provided within the standing-away region thereof substantially radially directed slots.

In accordance with other additional features of the invention, the spring disc serves simultaneously for applying force to the damping linings and and as carrier member for the clutch friction linings. Within the radial limits of the clutch friction linings, the spring disc is of flat or planar construction in one embodiment of the invention and, in accordance with a further feature of the invention, the spring disc is subdivided, in the region thereof adjacent the clutch friction linings, into individual wave-shaped segments extending in the peripheral direction of the clutch disc for spring loading the clutch linings. At the peaks of the waves formed in the individual segments, the clutch friction linings are fastened at both sides of the segments, for example, by riveting.

In accordance with yet another feature of the invention, the spring disc which acts as a carrier member is of such construction that the friction linings are prestressed toward one another. The disc-shaped carrier member has a flat and planar construction in the radially extending region thereof adjacent the clutch friction linings and, in the region of the radial extension of the clutch friction linings, individual spring segments having a wave-like shape in the peripheral direction of the clutch disc abut the disc-shaped carrier member. Both friction linings are prestressed by a spacer rivet having a step-shaped profile, the friction linings being respectively alternatingly riveted to the disc-shaped carrier member and to the individual wave-shaped segments.

On the other hand, in accordance with another feature of the invention, the disc-shaped carrier member may be provided with waves within the radial region in which the aforementioned web-shaped spring segments abut and the carrier member is subdivided into segments in the radial region thereof adjacent the friction linings so that respectively two segments that are wave-shaped in the peripheral direction of the clutch disc are located with the opposing waves thereof facing in opposite directions. The prestressing of the spring segments is effected by spacer rivets which alternatingly and simultaneously fasten respectively one of the friction linings to one of the spring segments firmly.

In accordance with yet another feature of the invention, the spring or carrier disc is connected to the entrainer plate so as to be nonrotatable relative to one another and, in fact, preferably is firmly riveted to the entrainer plate in the diametrically outer region thereof.

In clutch discs wherein the hub flange is disposed between the entrainer plate and a cover disc, in accordance with another feature of the invention, the spring disc is fastened to the entrainer plate by spacer rivets which connect the entrainer plate and the cover disc to one another.

In clutch discs wherein the spring segments are riveted to the entrainer plate to effect prestressing of the clutch friction linings, in accordance with a concomitant feature of the invention, the spring disc is connected to the entrainer plate by the same rivet with which the spring segments are fastened to the entrainer plate. Other features which are considered as characteristic for the invention are set forth in the appended claims.

Although the invention is illustrated and described herein as embodied in clutch disc, it is nevertheless not intended to be limited to the details shown, since various modifications and structural changes may be made therein without departing from the spirit of the invention and within the scope and range of equivalents of the claims.

The construction and method of the operation of the invention, however, together with additional objects and advantages thereof, will be best understood from the following description of specific embodiments when read in connection with the accompanying drawings, in which.

Figure 1:
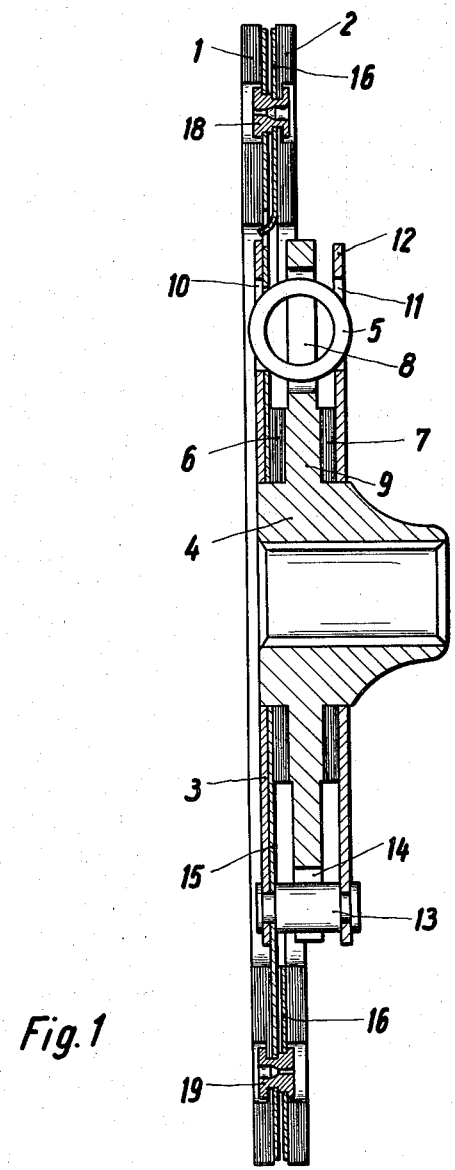
FIG. 1 is a sectional view of a clutch disc constructed in accordance with our invention.

Referring now to the drawings and first, particularly to FIGS. 1 to 4 thereof, there is shown a clutch disc according to our invention which includes a clamping device disposed in the path of force transmission of the clutch disc between friction linings 1 and 2, on the one hand, and an entrainer plate 3 and a hub 4, on the other hand.

The clamping device is formed of force storing members 5 which, in the embodiment of FIGS. 1 to 4, are constructed as compression springs, and damping linings 6 and 7. The damping springs 5 are inserted in window-shaped recesses 8 formed in a flange 9 extending from the hub 4 and are in abutting engagement with both somewhat radially directed end contours of window-like recesses 10 and 11 within the entrainer plate 3 and a cover disc 12, respectively. The springs 5 are also protected against falling out of the clutch disc due to their partial insertion in the window-shaped recesses 10 and 11.

The entrainer plate 3 and the cover disc 12 are connected to one another through spacer rivets 13 extending through recesser 14 formed in the hub flange 9.

The damping linings 6 and 7 are in frictional engagement with the cover disc 12 and with the entrainer plate 3 and thereby also with the clutch friction linings 1 and 2.

In accordance with our invention, the damping linings 6 and 7 are subjected to a required pressure by a spring element 15 which is constructed in the form of a disc abutting, on the one hand, against the damping lining 6 and, on the other hand, against the entrainer plate 3. The spring disc 15 carries the clutch friction linings 1 and 2 and is located in the space between the components of the clutch disc that are twistable or turnable, relative to one another.

Figure 2:
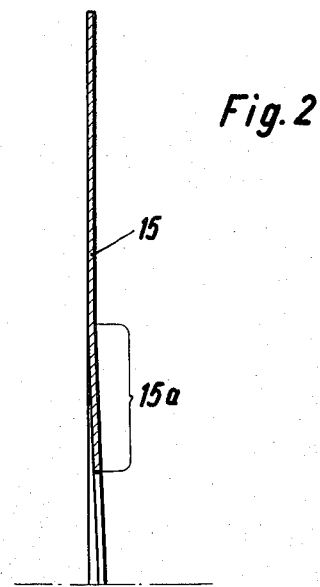
FIG. 2 is a sectional view of a component, namely the spring disc element of the clutch disc of FIG. 1.
Figure 3:
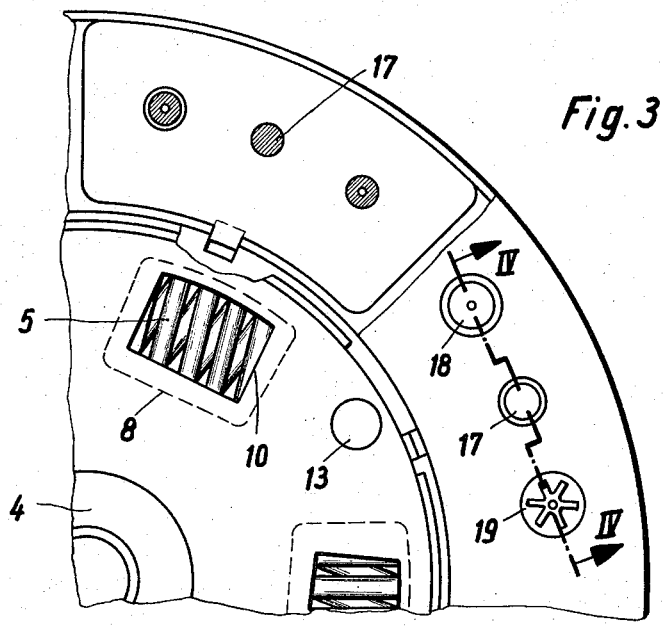
FIG. 3 is a quarter view of the clutch disc as seen from the right-hand side of FIG. 1.
Figure 4:
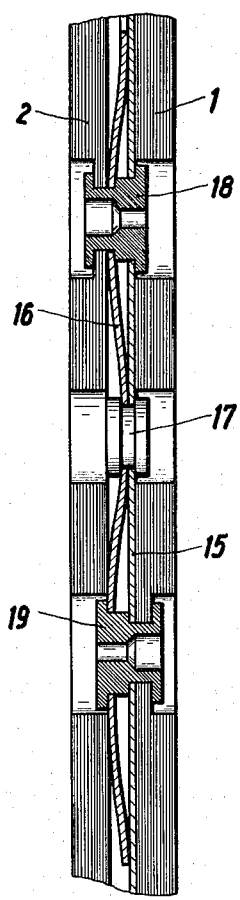
FIG. 4 is a sectional view of FIG. 3 taken along the line IV—IV in the direction of the arrows.

The spring disc 15, as shown in the cross section thereof in FIG. 2 before the installation thereof in the clutch disc, stands away toward one side in the region 15a of the inner diameter thereof, i.e., it is formed either conically, parabolically or the like. The region 15 a of the spring disc 15, which is raised out of the plane in which the remainder of the disc 15 is disposed, goes radially beyond that region over which the damping linings 6 and 7 extend.

Due to the fact that the spring disc 15 stands away in the manner illustrated in FIG. 2, an optimal uniform damping is produced thereby, in the installed condition thereof, over the path of wear of the damping linings 6 and 7.

The spring disc element 15, which serves simultaneously for applying pressure to the damping linings 6 and 7 and as carrier members for the clutch friction linings 1 and 2, is of flat or planar construction within the region of the clutch friction linings 1 and 2, the clutch friction linings being riveted or secured by adhesive to the spring disc element 15 at this planar area thereof.

In accordance with another feature of our invention, the friction linings 1 and 2 are additionally spring-loaded with the aid of this springy disc 15. One possible way of effecting this spring-loading is shown especially in FIGS. 1, 3 and 4. Wave-shaped spring segments 16 are fastened by rivets 17 in the peripheral direction of the clutch disc on the spring disc 15, which has the construction of a disc-shaped carrier member. By means of spacer rivets 18 and 19, having a step-shaped profile, the friction lining 1 is riveted adjoiningly to the spring disc 15 and the friction lining 2 to the wave-shaped spring segment 16.

Figure 5:
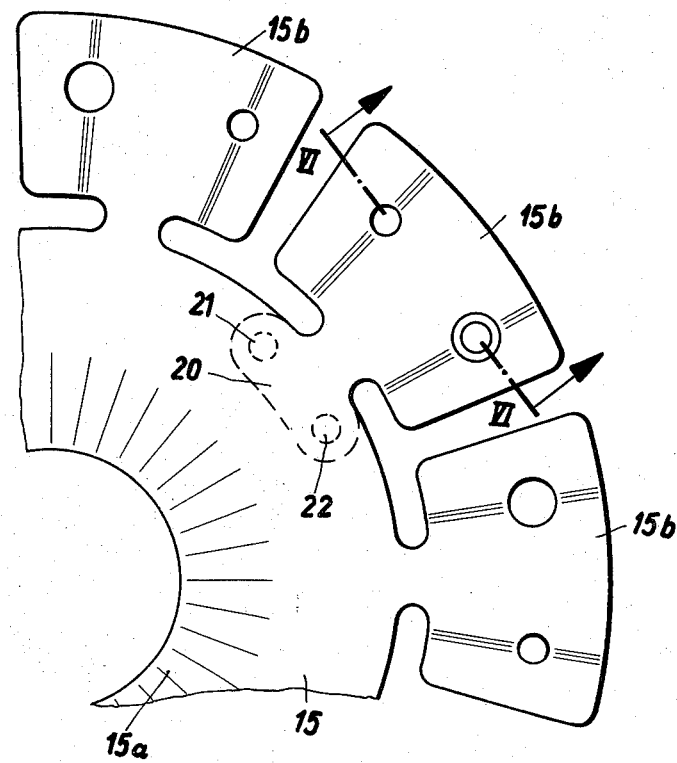
FIG. 5 is a quarter view of the spring disc element as seen from the right-hand side of FIG. 2.
Figure 6:
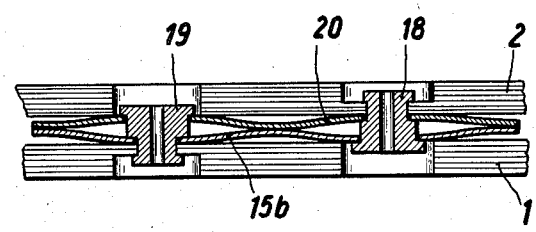
FIG. 6 is a sectional view of FIG. 5 taken along the line VI—VI in the direction of the arrows.

Another way of effecting the spring-loading of the friction linings 1 and 2 with the aid of the spring disc 15 is provided by the embodiment illustrated in FIGS. 5 and 6.

In FIG. 5 part of the spring disc 15 is shown in plan view. The radial inner and raised or away-standing region 15a thereof is clearly indicated. In that region of the spring disc 15 wherein the friction linings 1 and 2 of the clutch are provided i.e., at the radially outer periphery of the spring disc 15, the latter is stamped out so that individual wave-shaped segments 15b are produced extending in the peripheral direction of the clutch disc. These segments 15b, as shown especially in the sectional view of FIG. 6 which is taken along the line IV—IV in FIG. 5, are located opposite wave-shaped segments 20, which are formed analogous to the segments 15b of the spring disc 15, although with oppositely directed curvature. These segments 20 are formed with an extension shown in broken lines in FIG. 5 and are connected by rivets 21 and 22 to the spring disc 15. The rivets 21 and 22 can serve simultaneously for fastening the spring disc 15 to the carrier or entrainer plate 3.

The clutch friction linings 1 and 2, as shown in FIG. 6, lie up against the peaks of the waves formed in the segments 15b and are alternately riveted to the segments 15b and 20, respectively, by rivets 19 and 18.

Figure 7:
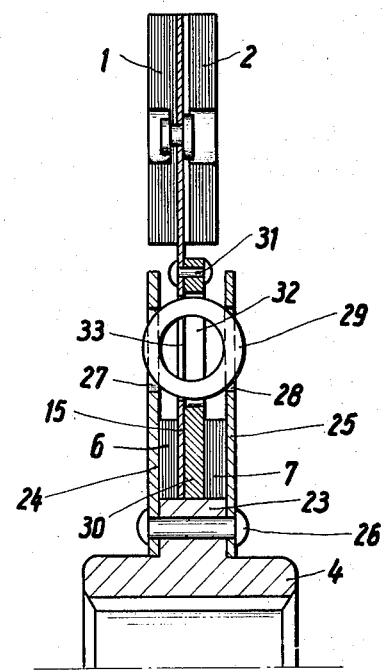
FIG. 7 is an upper half view similar to that of FIG. 1 of another embodiment of the clutch disc of our invention.
Figure 8:
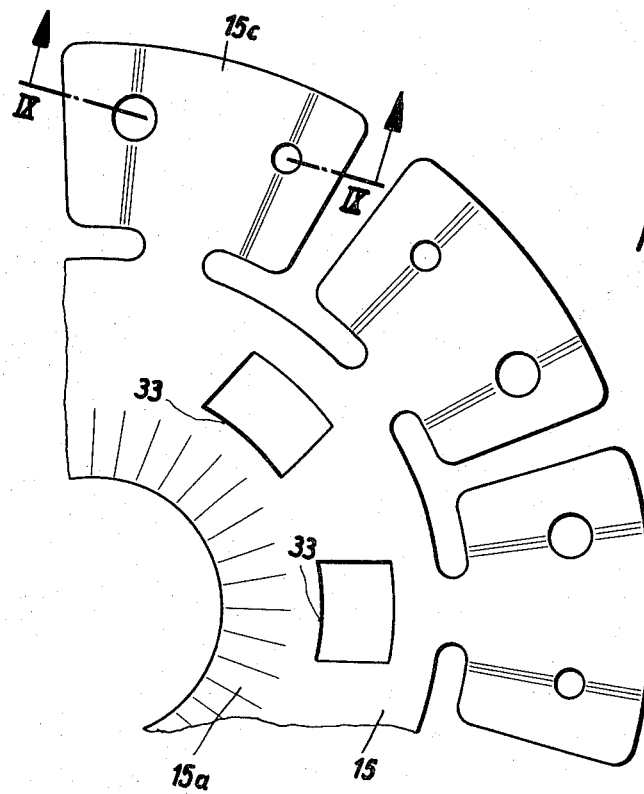
FIG. 8 is a view similar to that of FIG. 5 of another embodiment of the spring disc element.
Figure 9:
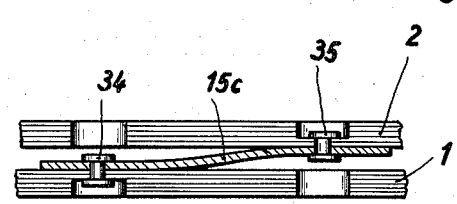
FIG. 9 is a sectional view of FIG. 8 taken along the line IX—IX in the direction of the arrows.

In FIGS. 7 to 9, there is shown a further embodiment of our invention.

In the clutch disc shown in section in FIG. 7, the hub 4 thereof has a flange projection 23, at the lateral surfaces of which, a respective cover disc 24 and 25 are fastened by rivets 26 (only one of which is shown in FIG. 7). Recesses 27 and 28 are provided within the cover discs 24 and 25, respectively, for the springs 29 inserted in the peripheral direction of the cover discs 24 and 25. An entrainer plate 30 is disposed coaxially to the flange projection 23 and is rotatable about the hub 4 and the flange projection 23. The spring disc, as in the aforedescribed embodiments, is raised up or stands away in the diametrically inner region thereof toward one side thereof and, in fact, in a direction toward the damping lining 6 with which it is in frictional contact. The spring disc 15 is fastened by rivets 31 to the entrainer plate 30 in the diametrically outer region thereof. Both the carrier or entrainer plate 30 as well as the spring disc 15 are formed with window-shaped recesses 32 and 33 wherein the springs 29 are disposed, and through the substantially radially extending end edges of the recesses 32 and 33, the torque being transmitted to the springs 29, is further transmitted by the cover discs 24 and 25 to the hub 4.

As is noted especially from FIG. 8, the spring disc 15, in the region of the clutch friction linings 1 and 2, is subdivided into segments 15c which, as shown in the sectional view of FIG. 9 taken along the line IX—IX in FIG. 8, are wave-shaped and are fastened by rivets 34 and 35 with the friction linings 1 and 2.

We claim:

1. Clutch disc comprising a hub, an entrainer plate coaxially disposed and turnable relative to said hub, a pair of clutch friction linings mounted coaxially to one another and to said hub, a damping device located in a force transmission path between said entrainer plate and said hub, on the on hand, and between said pair of clutch friction linings, on the other hand, said damping device comprising force storing means operatively connected to said hub and to said entrainer plate, damping lining means disposed coaxially to said hub, a spring member in stressing engagement with said damping lining means so as to frictionally connect the same to said entrainer plate, said spring member being located in a space between said relatively turnable entrainer plate and a radially extending portion of said hub and being in the form of a disc having a diametrically inner portion thereof abutting said damping lining means at one side thereof and said entrainer plate at the other side thereof, said diametrically inner portion standing away on one side of said spring disc in direction toward said damping lining means, said spring disc having a diametrically outer portion thereof extending diametrically beyond said damping lining means, said spring disc and said entrainer plate being mutually connected at said diametrically outer portion of said spring disc so as to be fixed against rotation relative to one another, said pair of clutch friction linings being carried by said spring member.

2. Clutch disc according to claim 1, wherein said portion of said spring disc standing away from said plate extends radially outwardly over said damping lining means.

3. Clutch disc according to claim 1, wherein said spring disc is formed at least in said inner portion thereof with substantially radially directed slots.

4. Clutch disc according to claim 1 wherein said spring disc, in addition to carrying said clutch friction linings, serving simultaneously for applying force to said damping lining means.

5. Clutch disc according to claim 1, wherein said spring disc is subdivided in the region thereof adjacent said clutch friction linings, into individual wave-shaped segments extending in peripheral direction of the clutch disc.

6. Clutch disc according to claim 5, including, in the region of said clutch friction linings, individual spring segments having a wave-like shape in peripheral direction of the clutch disc abut said spring disc, and spacer rivets with a step-shaped profile prestressing both said friction linings, said spacer rivets securing said friction linings respectively alternatingly to said spring member and to said wave-shaped segments.

7. Clutch disc comprising a hub, an entrainer plate coaxially disposed and turnable relative to said hub, a pair of clutch friction linings mounted coaxially to one another and to said hub, a damping device located in a force transmission path between said entrainer plate and said hub, on the one hand, and between said pair of clutch friction linings, on the other hand, said damping device comprising force storing means operatively connected to said hub and to said entrainer plate, damping lining means disposed coaxially to said hub, a spring member in stressing engagement with said damping lining means so as to frictionally connect the same to said entrainer plate, said spring member being located in a space between said relatively turnable entrainer plate and a radially extending portion of said hub and being in the form of a disc abutting said damping lining means at one side thereof and said entrainer plate at the other side thereof, said spring disc and said entrainer plate being mutually connected so as to be nonrotatable relative to one another, said pair of clutch friction linings being carried by said spring member, and a cover disc coaxially mounted on said hub, said spring disc and said entrainer plate being secured to one another by spacer rivets that connect said entrainer plate to said cover disc.

8. Clutch disc according to claim 6 including rivets means connecting said wave-shaped segments to said spring disc, said rivets means further connecting said spring disc to said entrainer plate.

9. Clutch disc according to claim 6, said spring disc being formed at least in said inner portion thereof with substantially radially directed slots, and including a cover disc coaxially mounted on said hub, rivet means connecting said wave-shaped segments to said spring disc, said rivet means further connecting said spring disc to said cover disc.

10. Clutch disc according to claim 1, wherein said spring disc is prestressed direction toward said damping lining means, said prestressing being substantially constant over a path of wear of said damping lining means.

* * * * *